Sept. 24, 1968 D. P. THURLEY ET AL 3,402,619
SIDE WASHER FOR WORM AND ROLLER STEERING GEARS
Filed April 3, 1967 2 Sheets-Sheet 1
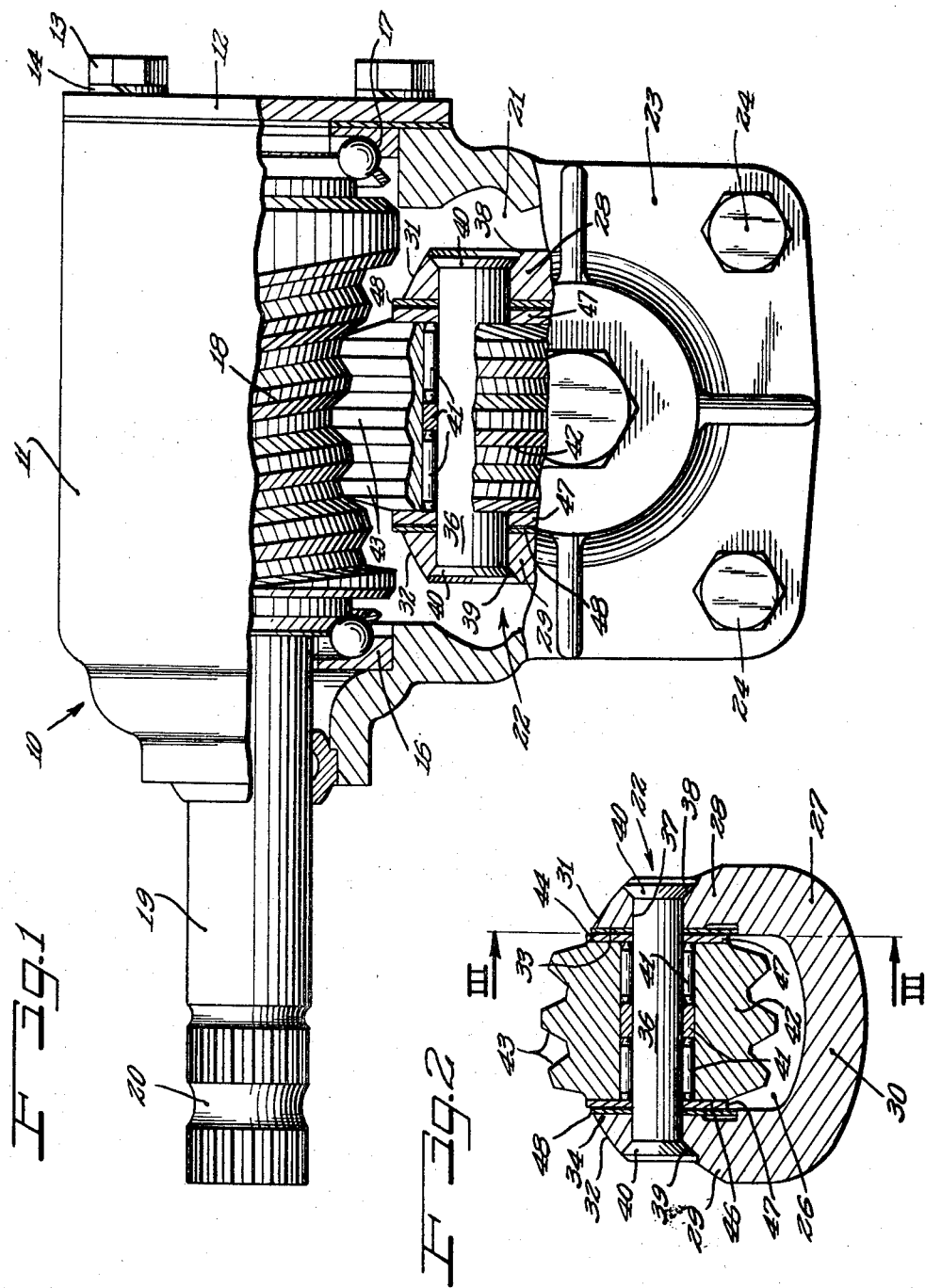
INVENTORS
Douglas P. Thurley
Ronnie H. Smith
BY Hill, Sherman, Meroni, Gross & Simpson ATTORNEYS

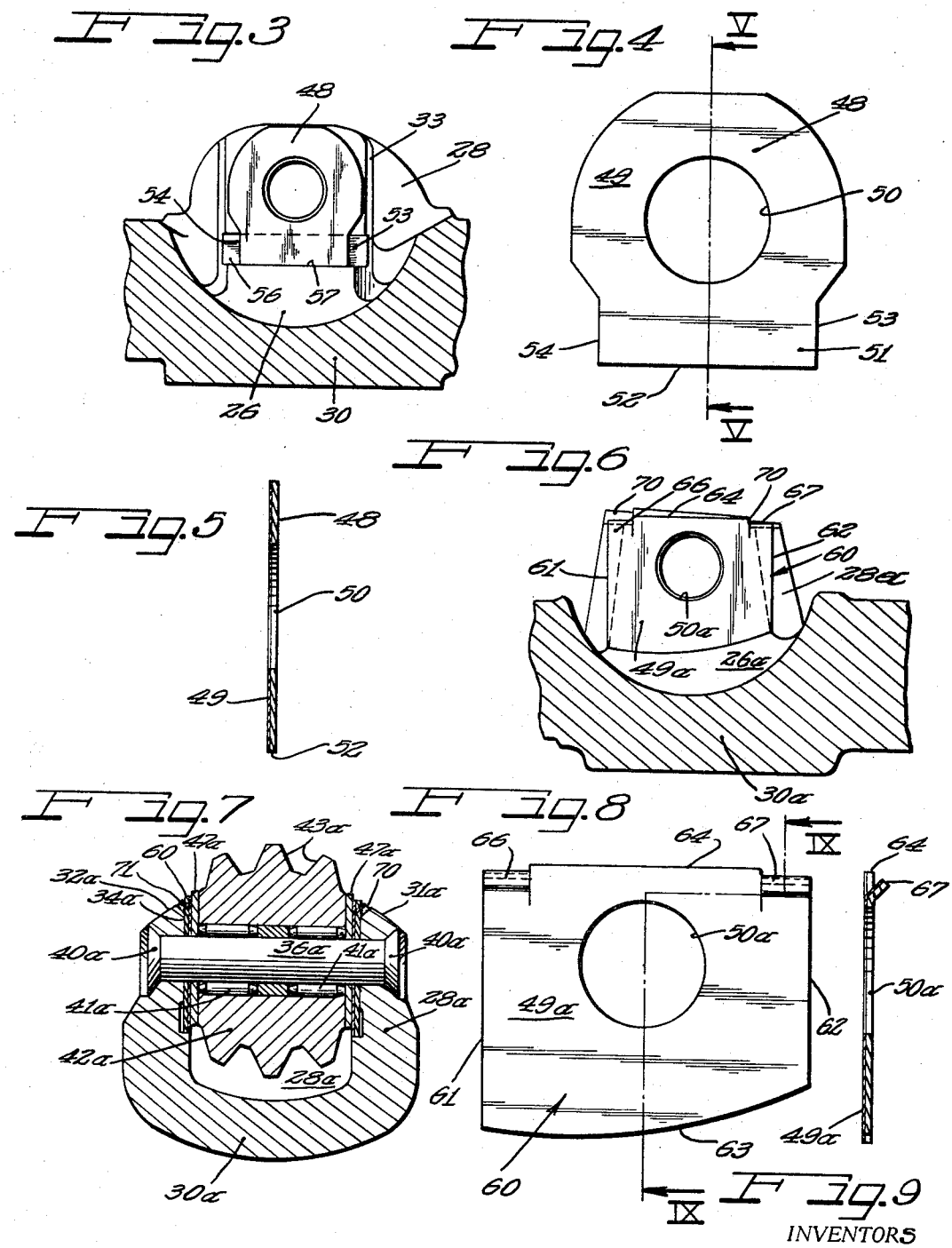

United States Patent Office 3,402,619
Patented Sept. 24, 1968

3,402,619
SIDE WASHER FOR WORM AND ROLLER STEERING GEARS
Douglas P. Thurley, Lebanon, and Ronnie H. Smith, Old Hickory, Tenn., assignors to TRW Inc., Cleveland, Ohio, a corporation of Ohio
Filed Apr. 3, 1967, Ser. No. 627,947
13 Claims. (Cl. 74—425)

ABSTRACT OF THE DISCLOSURE

A roller tooth for use in a worm and roller type gear assembly wherein a flat thrust washer having a radial anti-friction surface is inserted between the roller tooth and the side walls of the cross shaft pocket and wherein anti-rotation means are provided to prevent rotation of the thrust washer with respect to the shaft ear, thereby to cause all relative rotation to occur at the radial antifriction face of the thrust washer.

Background of the invention (1) *Field of the invention.*—This invention relates generally to steering assemblies for dirigible vehicles and more specifically to worm and roller type gear assemblies.

(2) *Description of the prior art.*—In accordance with the prior art, a roller tooth is provided for a worm and roller type gear assembly and a simple hardened steel lapped and polished washer is located on each respective side of the roller tooth between the roller tooth and the respective ears disposed on opposite sides of the cross shaft pocket supporting the roller tooth. So long as oil film lubrication was maintained between the side washers and the roller tooth, the steering gear performance was satisfactory. However, under high loading conditions as well as during times of sustained loading, the lubricant was squeezed out from between the rotating surfaces resulting in very high friction. Accordingly, under such operating conditions the steering gear would "hang up" or fail to reverse. An attempt was made to overcome such deficiency by adding a thrust washer having an antifriction surface, however, such thrust washer would rotate with the other relatively rotating parts, thereby negating the effectiveness of the thrust washer for its intended purpose.

Summary of the invention

In accordance with the principles of the present invention, there is interposed between the roller tooth and the side walls of the cross shaft pocket a flat thrust washer having a radial antifriction surface. For example, an ordinary soft steel washer may be provided having a coating comprising materials such as sintered bronze, lead particles and Teflon particles. Anti-rotation means are specifically provided to prevent rotation of the thrust washer with respect to the shaft ear, thereby to cause all relative rotation to occur at the radial antifriction surface of the washer. Such anti-rotation means can take different forms. For example, a flat side of the anti-thrust washer is retained on the bottom of a milled pocket in the cross shaft, or tangs or ears may be offset on the thrust washer into milled recesses on each side of the roller tooth pin on the upper flanks of the shaft ears. By virtue of such provision, rotation of the thrust washers is prevented and all relative rotation occurs at the radial anti-friction surface of the thrust washer. High load steering efficiency is thus insured and a steering gear provided with the features of the present invention operates satisfactorily under high loading conditions as well as under sustained loading.

Brief description of the drawings

FIGURE 1 is an elevational view with parts broken away showing a worm and roller type gear assembly of particular utility in a steering assembly;

FIGURE 2 is a cross-sectional view with parts shown in elevation illustrating the roller tooth removed from the assembly of FIGURE 1 for identification of the structural components thereof;

FIGURE 3 is a fragmentary cross-sectional view with parts removed for the sake of clarity taken generally on line III—III of FIGURE 2;

FIGURE 4 is an elevational view somewhat enlarged showing the improved thrust washer of the present invention;

FIGURE 5 is a cross-sectional view taken on line V—V of FIGURE 4;

FIGURE 6 is a view similar to FIGURE 3 but showing an alternative form of thrust washer construction in assembled form of a roller tooth assembly;

FIGURE 7 is a view similar to FIGURE 2 and showing the form of the invention as illustrated in FIGURE 6;

FIGURE 8 is an enlarged elevational view of the thrust washer provided in accordance with the form of the invention illustrated in FIGURES 6 and 7; and FIGURE 9 is a cross-sectional view taken on line IX—IX of FIGURE 8.

Description of the preferred embodiments

Referring generally to FIGURE 1, there is shown a worm and roller steering gear at 10 comprising a housing 11 closed at one end by a cover 12 retained by a plurality of fastening nuts 13 and lock washers 14. Spaced bearing assemblies are shown at 16 and 17 for journaling a worm 18 formed on a portion of the shaft 19 located within the housing 11. The shaft 19 has a coupling portion 20 formed at the free end thereof for integration of the worm and roller steering gear in the steering gear assembly of a dirigible vehicle. The housing 11 has an enlarged portion forming a housing recess 21 in which is situated a roller tooth subassembly shown generally at 22. An additional cover 23 is retained on that portion of the housing 11 by appropriate fastening means shown at 24.

Referring now to the roller tooth subassembly 22, as is more clearly shown in FIGURE 2 in conjunction with FIGURE 1, it will be noted that means are provided which form a cross shaft pocket 26 and more specifically comprising a cross shaft 27 having spaced apart shaft ears shown at 28 and 29, respectively. The shaft ears 28 and 29 extend generally parallel to one another and are disposed to project upwardly from a bight portion 30 on the cross shaft 27. Each of the ears 28 and 29 terminate at upper flank portions shown at 31 and 32, respectively.

On opposite sides of the shaft pocket 26 the ears 28 and 29 provide side walls identified at 33 and 34, respectively.

A pin extends across the cross shaft pocket 26 and which pin is shown generally at 36. The ears 28 and 29 are formed with a bore 37 through which the pin 36 extends and the ear 28 is counterbored as at 38, while the ear 29 is counterbored as at 39, thereby to receive an enlargement on each respective free end of the pin 36 as shown at 40, 40, thereby to retain the pin in firm assembly with the cross shaft member 30.

A needle bearing assembly is shown at 41 and serves to journal a roller tooth 42 on the pin 36. The roller tooth 42 is characterized by a plurality of teeth 43 on its peripheral surface which engage the mating tooth portions of the worm 18. Further, the roller tooth 42 has spaced parallel radial walls shown at 44 and 46 respectively. The spacing dimension between the radial faces on the roller tooth 44 and 46 is less than the spacing dimension between the side walls 33 and 34, thereby to leave space therebetween.

In accordance with the principles of the present invention, there is interposed between the roller tooth and the respective side walls the improved washer means of the present invention. In the form of the invention illustrated in FIGURE 2 a simple washer 47 is provided on each side of the roller tooth 42 and may comprise a flat annulus made of hardened steel which is lapped and polished, thereby to provide a side washer.

In accordance with the present invention, an additional flat thrust washer 48 is inserted between the washer 47 and each respective side wall 33 and 34.

Referring specifically to FIGURES 4 and 5, it may be noted that the flat thrust washer 48 may comprise a soft steel material and has a radial face forming an antifriction surface shown in FIGURE 5 at 49. The antifriction surface of the metal body portion is coated with antifriction material, for example, sintered bronze as well as lead and Teflon particles which provide an extremely low coefficient of friction capable of exceeding oil film strength. The washer 48 has a central opening 50 for passing the pin 36 and in the form of the invention illustrated in FIGURES 2, 3, 4 and 5, it will be noted the washer is provided with an anti-rotation means which takes the form of a lug 51 having a lower abutment surface 52 extending between edges 53 and 54. The corresponding side wall 33 and 34 of the ears 28 and 29 is milled to form a complementary pocket 56, thereby to provide an abutment surface 57 for engaging the abutment surface 52 on the washer 48 and preventing relative rotation of the washer 48 and the cross shaft 30. Accordingly, all relative rotation will take place at the antifriction surface 49 insuring good performance under high loading conditions, as well as at times of sustained loading. Because of the extremely low coefficient of friction exhibited at the antifriction surface 49, improved performance is insured.

In the form of the invention illustrated in FIGURES 6, 7 and 8, most of the components are identical to those already described and will be referred to by the same reference numerals with the additional suffix *a*. The washer corresponding to the thrust washer 48 is slightly different in form and is illustrated in detail in FIGURE 8. Thus, it will be noted that the washer is indicated at 60 and is generally rectangular in configuration, having spaced edges 61 and 62 at opposite sides thereof, as well as a bottom edge 63 and an upper edge 64. At opposite ends of the upper edge 64, there is formed a struck-out tank 66 and 67 with each tank being offset laterally with respect to the major plane of the washer. The respective ears 28a and 29a of the cross shaft 30a are formed with milled recesses 70 and 71 on each side of the roller tooth pin 36a on the upper flanks 31a and 32a of the shaft ears 28a and 29a. Thus, the two tangs or ears 66 and 67 are, in effect, bent down into the milled recesses 70 and 71, thereby to prevent rotation of the thrust washer 60.

It will be noted from an inspection of the drawings that the side walls 33 and 34 are so disposed as to accommodate the use of side washers 47 and thrust washers 48 which are substantially coextensive in area with the adjoining sideface or bearing surfaces of the roller tooth 42. Thus, an extensive backing is provided for the antifriction surface 49, which extends radially outwardly of the pin 36 in all directions to assist in distributing the forces transmitted over the thrust surfaces.

Although minor structural modifications might be suggested by those versed in the art, it should be understood that we wish to embody within the scope of the patent warranted hereon all such modifications as reasonably and properly come within the scope of our contribution to the art.

We claim:

1. In a steering gear assembly, an improved worm and roller-type gear assembly comprising
    a roller tooth,
    means forming a cross shaft pocket having side walls constituting shaft ears,
    and washer means comprising a flat thrust washer inserted between said roller tooth and said side walls, said flat thrust washer comprising
        a soft steel washer having a radial face on which is formed an antifriction surface substantially coextensive with the adjoining sideface of the roller tooth,
        and a coating on said antifriction surface made of antifriction material,
    and anti-rotation means to prevent rotation of said thrust washer with respect to the corresponding shaft ear,
    thereby to cause all relative rotation to occur at said radial face of said thrust washer.

2. In a steering gear assembly as defined in claim 1, said anti-rotation means more particularly comprising a flat side formed on said thrust washer and engagingly retained by the bottom of a pocket formed in said side walls of said cross shaft pocket.

3. In a steering gear assembly as defined in claim 1, said anti-rotation means comprising lug and detent means between the washer and the cross shaft pocket side walls.

4. In a steering gear assembly as defined in claim 3, said lug and detent means more specifically comprising
    a detent recess formed on each side of the roller tooth on the upper flanks of the shaft ears formed by said side walls,
    and a tang offset from said washer into each re-respective detent recess.

5. In a steering gear assembly as defined in claim 1, said washer means comprising an additional side washer comprising a flat annulus of metal for filling the space between the roller tooth and the corresponding side walls.

6. In a steering gear assembly as defined in claim 1, said anti-friction material comprising bearing materials consisting of sintered metallic particles and tetrafluoroethylene.

7. For use in a steering gear assembly, a shaft assembly comprising
    a pin for carrying a roller tooth,
    means forming a cross shaft pocket for supporting said pin and having spaced side walls,
    a roller tooth on said pin inwardly of said side walls,
    means forming a bearing surface on opposite faces of said roller tooth extending radially outwardly of said pin,
    and washer means comprising a flat thrust washer interposed between each said bearing surface and a corresponding one of said side walls and having an antifriction radial surface substantially coextensive in area with said bearing surface,
    and anti-rotation means to prevent rotation of said washer relative to said bearing surface,
    thereby to cause all relative rotation to occur at said radial face of said thrust washer.

8. The assembly of claim 7 and further characterized by said anti-rotation means comprising
    interengaging abutment surfaces on said thrust washer and on said side walls.

9. The assembly of claim 8 and further characterized by said interengaging abutment surfaces comprising
    a lug on said thrust washer and a complementary wall on the bottom of said pocket.

10. The assembly of claim 7 and further characterized by
    said anti-rotation means comprising lug and detent means between the thrust washer and each respective side wall.

11. The assembly of claim 10 and further characterized by said lug and detent means comprising a recess formed on each side of said pin in each corresponding side wall and a tang offset from said thrust washer into each respective detent recess.

12. For use in a steering gear assembly as defined in claim 7,
    said washer means comprising an additional simple flat washer forming a side washer inserted between said thrust washer and each said corresponding bearing surface on said roller tooth.

13. In a steering gear assembly, an improved worm and roller-type gear assembly comprising
    a roller tooth,
    means forming a cross shaft pocket having side walls, and a flat thrust washer inserted between said roller tooth and said walls,
        said flat thrust washer comprising a metallic washer having a radial face on which is formed an anti-friction surface and a porous coating on said anti-friction surface comprising bearing materials consisting of sintered metallic particles and tetrafluoroethylene,
    and anti-rotation means to prevent rotation of said washer with respect to each corresponding side wall, thereby to cause all relative rotation to occur at said radial face of said washer.

References Cited

UNITED STATES PATENTS

| | | | |
|---|---|---|---|
| 2,075,745 | 3/1937 | Murden | 74—500 |
| 2,351,617 | 6/1944 | Katcher | 74—500 |
| 3,056,709 | 10/1962 | Rising et al. | |
| 3,268,983 | 8/1966 | Straub | 308—238 X |
| 3,294,568 | 12/1966 | Gossmann | 308—238 X |

FOREIGN PATENTS 1,272,392   8/1961   France.

FRED C. MATTERN, JR., *Primary Examiner.*

LEONARD H. GERIN, *Assistant Examiner.*